(12) United States Patent
Abdul Jabbar

(10) Patent No.: US 11,063,271 B2
(45) Date of Patent: Jul. 13, 2021

(54) ELECTROLYTE WITH EMBEDDED METAL FOR SOLID OXIDE ELECTROCHEMICAL DEVICES

(71) Applicant: Nissan North America, Inc., Franklin, TN (US)

(72) Inventor: Mohammed Hussain Abdul Jabbar, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 146 days.

(21) Appl. No.: 16/528,082

(22) Filed: Jul. 31, 2019

(65) Prior Publication Data

US 2021/0036340 A1    Feb. 4, 2021

(51) Int. Cl.
*H01M 8/0273*    (2016.01)
*H01M 8/124*    (2016.01)

(52) U.S. Cl.
CPC .. *H01M 8/0273* (2013.01); *H01M 2008/1293* (2013.01)

(58) Field of Classification Search
CPC ............... H01M 8/0273; H01M 2008/1293
See application file for complete search history.

(56) References Cited

U.S. PATENT DOCUMENTS

| 5,753,385 | A | 5/1998 | Jankowski et al. |
| 8,182,943 | B2 | 5/2012 | Visco et al. |
| 8,530,071 | B2* | 9/2013 | Kwon ..................... H01M 4/74 429/122 |
| 9,905,871 | B2 | 2/2018 | Pozvonkov et al. |
| 2005/0037251 | A1* | 2/2005 | Horiuchi ............. H01M 8/1246 429/441 |
| 2007/0128504 | A1* | 6/2007 | Horiuchi ............. H01M 8/1213 429/482 |
| 2013/0224632 | A1* | 8/2013 | Roumi .................. H01M 4/131 429/516 |
| 2017/0162896 | A1 | 6/2017 | Pozvonkov et al. |
| 2017/0170515 | A1* | 6/2017 | Yushin ................ H01M 10/052 |

FOREIGN PATENT DOCUMENTS

WO    2003081693 A2    10/2003

* cited by examiner

*Primary Examiner* — Matthew J Merkling
(74) *Attorney, Agent, or Firm* — Young Basile Hanlon & MacFarlane, P.C.

(57) ABSTRACT

An electrolyte structure for use in a solid oxide electrochemical device includes a first solid electrolyte and a metal support embedded in the first solid electrolyte such that the first solid electrolyte forms an anode-facing layer that covers an anode-facing surface of the metal support, a cathode-facing layer that covers a cathode-facing surface of the metal support, and two opposing side layers that cover side surfaces of the metal support to form a continuous path around the metal support.

20 Claims, 5 Drawing Sheets

ELECTROLYTE WITH EMBEDDED METAL FOR SOLID OXIDE ELECTROCHEMICAL DEVICES

TECHNICAL FIELD

This disclosure relates to electrolyte structures for solid oxide electrochemical devices, the electrolyte structures including a solid electrolyte embedded with metal.

BACKGROUND

Solid oxide fuel cells having an electrolyte-supported configuration have poor mechanical strength and exhibit poor performance due to high electrolyte resistance. Solid oxide fuel cells having an electrode-supported configuration are somewhat stronger and better performing than the electrolyte-supported configurations. However, the solid oxide fuel cells having an electrode-supported configuration also fail to meet the strength and performance requirements needed for automotive applications.

SUMMARY

Disclosed herein are implementations of electrolyte structures and solid oxide electrochemical devices that incorporate the electrolyte structures.

One embodiment of an electrolyte structure for use in a solid oxide electrochemical device includes a first solid electrolyte and a metal support embedded in the first solid electrolyte such that the first solid electrolyte forms an anode-facing layer that covers an anode-facing surface of the metal support, a cathode-facing layer that covers a cathode-facing surface of the metal support, and two opposing side layers that cover side surfaces of the metal support to form a continuous path around the metal support.

One embodiment of a solid oxide electrochemical device comprises an anode comprising a porous solid anode support and an anode catalyst, a cathode comprising a porous solid cathode support and a cathode catalyst and an electrolyte structure positioned between the anode and the cathode. The electrolyte structure comprises a first solid electrolyte and a metal support embedded in the first solid electrolyte to form a continuous path of the first solid electrolyte around the metal support.

Other embodiments and aspects are described herein and contemplated in the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Solid oxide electrochemical devices, such as solid oxide cells, use fuels such as hydrogen, methane and ethanol. Some solid oxide, or ceramic, electrochemical devices operate at average temperatures as high as 1000° C. As a result of these high operating temperatures, exotic materials can be required that can withstand such temperatures. These devices require start-up time to heat the device to operating temperature before obtaining the required performance. A slow start-up time is disadvantageous for use of the solid oxide electrochemical devices in automobiles. To utilize hydrocarbons in solid oxide cells that are endothermic in nature, high heating is required to maintain an adequate operating temperature throughout the device.

The high temperatures at which the solid oxide electrochemical devices operate deteriorate the devices due to, for example, differences in coefficients of thermal expansion between components, whether electrolyte-supported or electrode-supported. The heavy vibrations and extreme cycling experienced when used in automotive applications can also exacerbate deterioration.

Disclosed herein are electrolyte structures for use in solid oxide electrochemical devices that provide sufficient mechanical strength to the device for use in automobile applications while also providing a structure that assists in bringing the device up to operating temperature and maintaining operating temperature throughout use.

Figure 1:
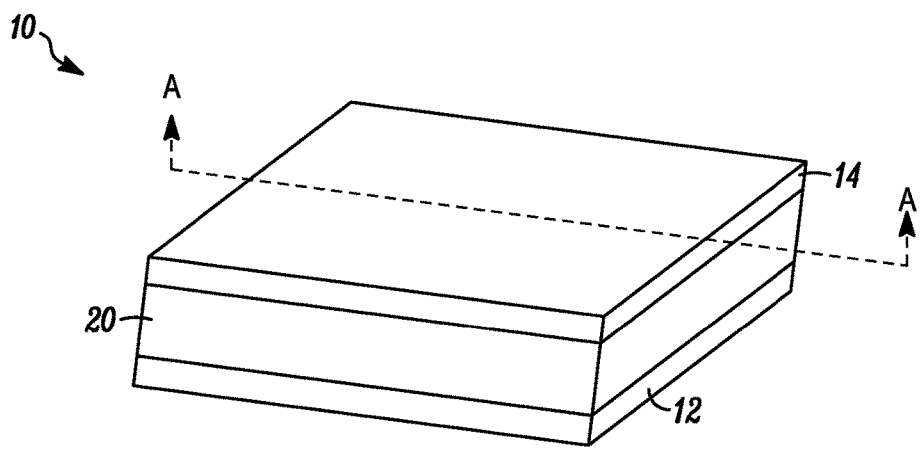
FIG. 1 is a perspective view of a unit cell of a solid oxide electrochemical device as disclosed herein.
Figure 2:
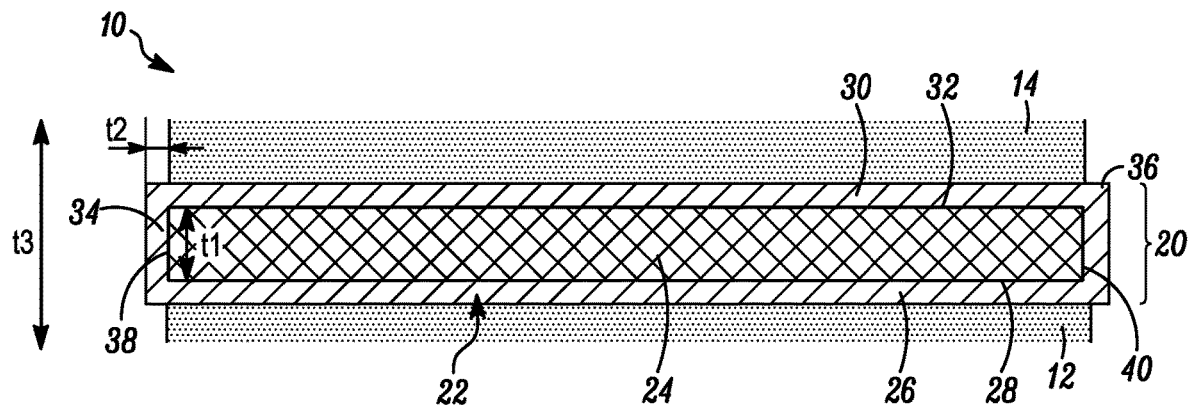
FIG. 2 is a cross-sectional view of the unit cell of FIG. 1 having an electrolyte structure as disclosed herein.

An embodiment of a unit cell 10 solid oxide electrochemical device is illustrated in FIG. 1. The solid oxide electrochemical device unit cell 10 includes an anode 12, a cathode 14 and an embodiment of an electrolyte structure 20 between the anode 12 and the cathode 14. FIG. 2 is a cross-sectional view of the solid oxide electrochemical device unit cell 10 of FIG. 1 along line A. The electrolyte structure 20 includes a first solid electrolyte 22 and a metal support 24 embedded in the first solid electrolyte 22 such that the first solid electrolyte 22 forms an anode-facing layer 26 that covers an anode-facing surface 28 of the metal support 24, a cathode-facing layer 30 that covers a cathode-facing surface 32 of the metal support 24, and two opposing side layers 34, 36 that cover side surfaces 38, 40 of the metal support 24 to form a continuous path around the metal support 24.

Figure 3:
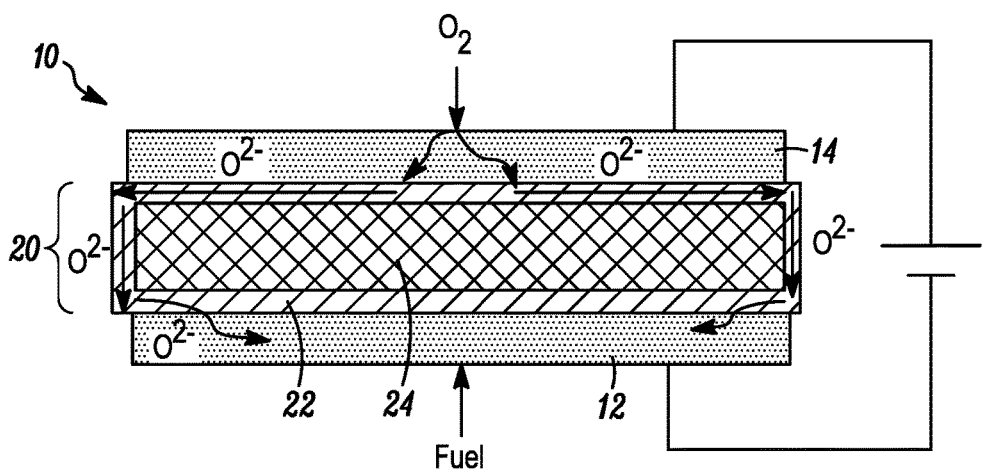
FIG. 3 is a schematic of oxygen ion flow through the continuous path of the electrolyte structure.

FIG. 3 illustrates how oxygen ions flow through the electrolyte structure 20. The embedded metal support 24 does not allow the oxygen ions to pass through. Accordingly, it is necessary that oxygen ions be able to diffuse through the bulk first solid electrolyte 22 along the interface between the electrolyte and the metal support 24 to flow around the metal support from the cathode to anode. Illustrated in FIG. 3 are oxygen ions flowing through the cathode 14, through the continuous path formed of the solid electrolyte 22, and into the anode 12.

The metal support 24 is illustrated as having the same width as the cathode 14 and anode 12. As shown, the metal support 24 can have the same surface area as each of the cathode 14 and the anode 12, with the continuous path formed by the first solid electrolyte 22 extending beyond the walls of the anode 12 and cathode 14 as illustrated. Alternatively, the metal support 24 can have a slightly smaller area than each of the cathode 14 and the anode 12, such that the two opposing side layers 34, 36 are fairly flush with the ends of each of the cathode 14 and the anode 12.

The length and width of the anode 12, cathode 14 and electrolyte structure 20 can be between about 1 cm and 50 cm. The metal support 24 can have a thickness t1 of between about 10 µm and 2000 µm. The thickness t1 of the metal support 24 should be as thin as possible while providing the requisite mechanical support. The thickness t1 will increase as the overall length and width of the layers increases. In addition to providing mechanical support to the unit cell 10 of the solid oxide electrochemical device, the metal support 24 can reduce the start-up time by bringing the unit cell 10 up to operating temperature more quickly. The metal support 24 is stainless steel, such as stainless steel 430. The metal support 24 must be a metal that is compatible with the first solid electrolyte 22. Nickel and aluminum are not compatible with the first solid electrolyte 22 and will therefore result in poor performance.

The first solid electrolyte 22 is selected from the group consisting of doped bismuth oxide, yttria-stabilized zirconia (YSZ), scandia- and yttria-stabilized zirconia (ScYSZ), and scandia-, cesium- and yttria-stabilized zirconia (ScCeYSZ). The metal support 24 can be embedded in the first solid electrolyte 22 by dip coating, for example. The thickness t2 of the anode-facing layer 26, the cathode-facing layer 30 and the opposing side layers 34, 36 is between about 0.1 µm and 20 µm. The overall thickness t3 of the unit cell 10 is between about 50 µm and 5000 µm.

The anode 12 comprises a porous anode support on which catalyst is deposited. The porous anode support and catalyst are materials known to those skilled in the art that are appropriate for use in solid oxide electrochemical devices. Non-limiting examples of materials that can be used as the porous anode support include Ni—YSZ, nickel-gadolinium-doped ceria (Ni-GDC), nickel-samarium-doped ceria (Ni-SDC), Ni—ScYSZ, and perovskite anodes (e.g., $SrCo_{0.2}Fe_{0.4}Mo_{0.4}O_3$). The catalyst can be, for example, cerium-zirconium mixed oxides ($CeZrO_{2-y}$) with transition metals or noble metals.

The cathode 14 comprises a porous cathode support on which catalyst is deposited. The porous cathode support and catalyst are materials known to those skilled in the art that are appropriate for use in solid oxide electrochemical devices. Non-limiting examples of materials that can be used as the porous cathode support include perovskite cathodes, $(La_{0.8}Sr_{0.2})_{0.95}$ $MnO_3$ (LSM), $La_{0.6}Sr_{0.4}CoO_3$ (LSC), $Sr_{0.5}Sm_{0.5}O_3$ (SSC), $Ba_{0.5}Sr_{0.5}Co_{0.8}Fe_{0.2}O_3$ (BSCF), $(La_{0.6}Sr_{0.4})_{0.95}(Co_{0.2}Fe_{0.8})O_3$ (LSCF), and $PrBa_{0.5}Sr_{0.5}Co_{1.5}Fe_{0.5}O_{5+y}$ (PBSCF) with and without GDC. The catalyst can be, for example, cerium-zirconium mixed oxides ($CeZrO_{2-y}$) with transition metals or noble metals.

Figure 4:
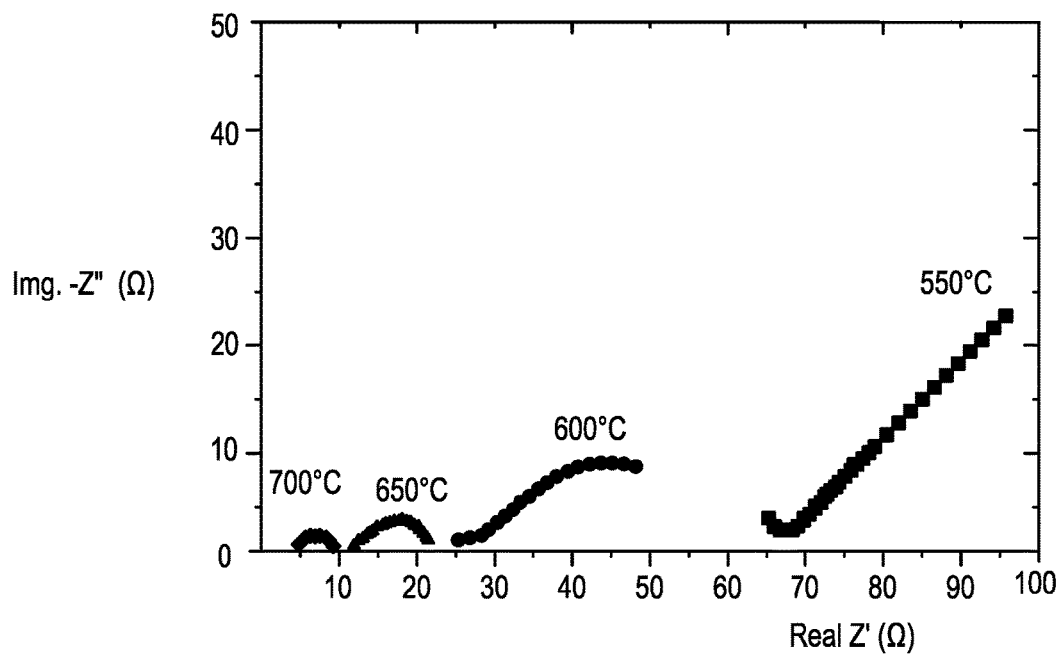
FIG. 4 is a Nyquist Plot comparing the internal resistance of the electrolyte structure disclosed herein at varying temperatures, with the X-axis representing the real axis of the complex impedance and the y-axis representing the imaginary axis of the complex impedance.

The combination of the first solid electrolyte 22 and the metal support 24 as together more as a ceramic electrolyte than a metal. FIG. 4 is a Nyquist Plot showing the temperature dependent impedance of the electrolyte structure 20 disclosed herein using stainless steel 430 and YSZ as measured in air. As shown, resistance decreases with an increase in the temperature. This illustrates that the ions travel on the surface of the metal support 24, resembling semiconductor type electrical conductivity behavior as opposed to metallic type behavior, in which resistance increases with an increase in temperature.

Figure 5:
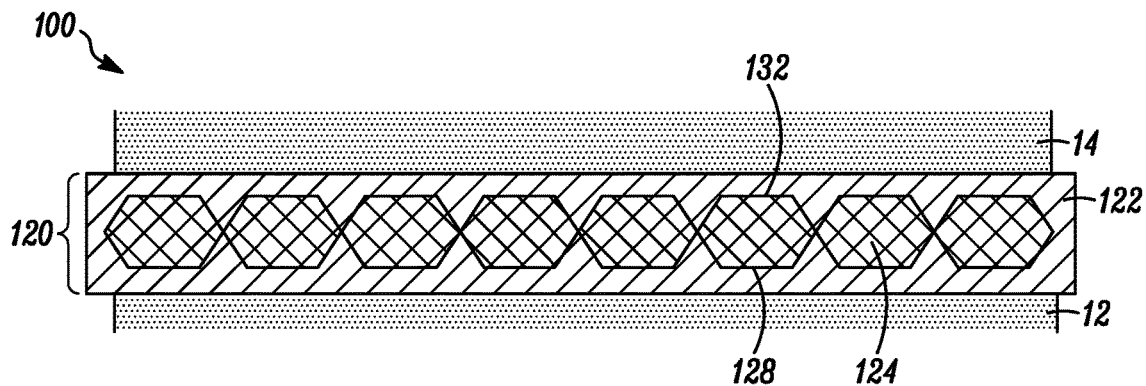
FIG. 5 is a cross-sectional view of another embodiment of a unit cell of a solid oxide electrochemical device as disclosed herein.

In other embodiments of the electrolyte structure for solid oxide electrochemical devices, one or both of the anode-facing surface 28 and the cathode-facing surface 32 of the metal support 24 can be structurally modified to improve adhesion of the first solid electrolyte 22 and increase surface area of the first solid electrolyte 22. FIG. 5 is a cross-sectional view of a unit cell 100 having an electrolyte structure 120 having a metal support 124 that has each of the anode-facing surface 128 and the cathode-facing surface 132 structurally modified. The first solid electrolyte 122 is applied to the metal support 124 so that it fills voids of the modified surface while still providing the continuous path around the metal support 124 for the ions to travel along.

Figure 6:
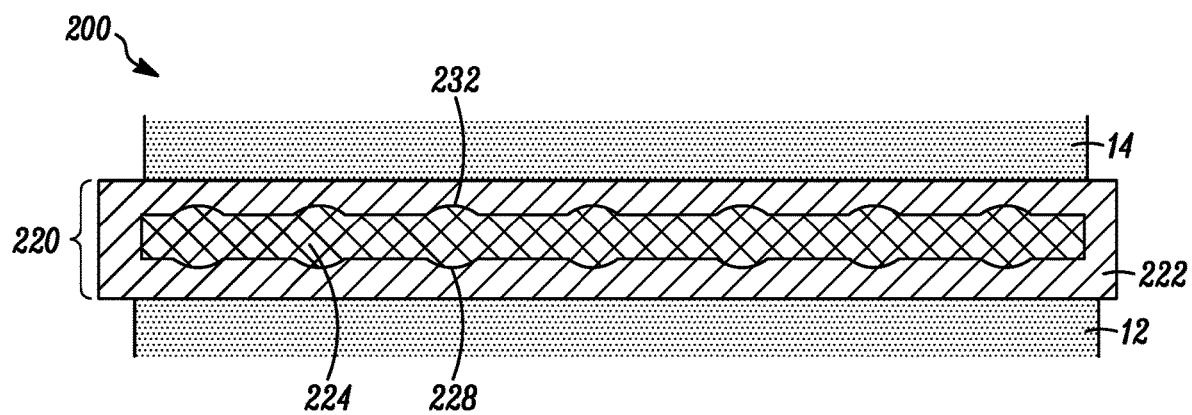
FIG. 6 is a cross-sectional view of yet another embodiment of a unit cell of a solid oxide electrochemical device as disclosed herein.
Figure 7:
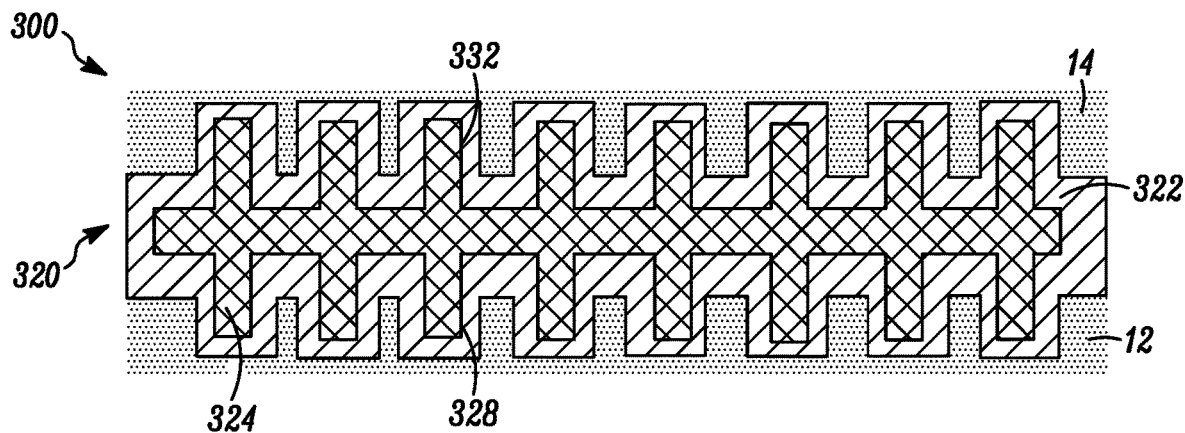
FIG. 7 is a cross-sectional view of yet another embodiment of a unit cell of a solid oxide electrochemical device as disclosed herein.

FIG. 6 is another example of a unit cell 200 having an electrolyte structure 220 having a metal support 224 that has each of the anode-facing surface 228 and the cathode-facing surface 232 structurally modified. FIG. 7 is yet another example of a unit cell 300 having an electrolyte structure 320 having a metal support 324 that has each of the anode-facing surface 328 and the cathode-facing surface 332 structurally modified. The modification to one or both of the anode-facing surface and the cathode-facing surface is not limited to the illustrated structures. The surface geometries may be formed on only one of the anode-facing surface or the cathode-facing surface rather than both as illustrated. Other modifications to one or both of the anode-facing surface and the cathode-facing surface are contemplated herein, so long as the metal support provides the requisite mechanical strength and the first solid electrolyte has a continuous path from one electrode to the other around the metal support. These contoured surface geometries can do one or more of the following: vary the overall mechanical strength of the unit cell, increase the surface area of the first solid electrolyte, increase the amount of first solid electrolyte while decreasing the amount of metal in the same amount of space and allow for more even heating throughout the unit cell. Other advantages are known to those skilled in the art.

Figure 8A:
FIGS. 8A-8F are schematics illustrating a method of making the unit cells of a solid oxide electrochemical device as disclosed herein.
Figure 8B:
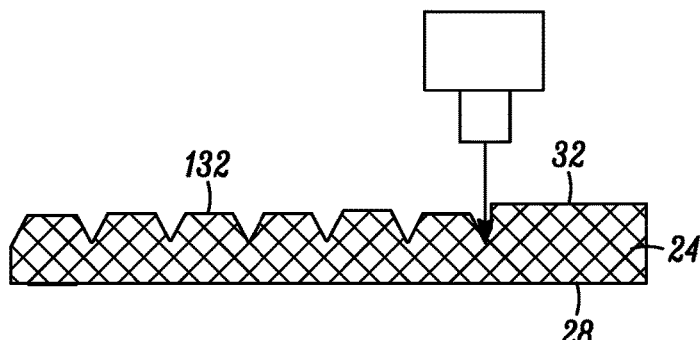
Figure 8C:
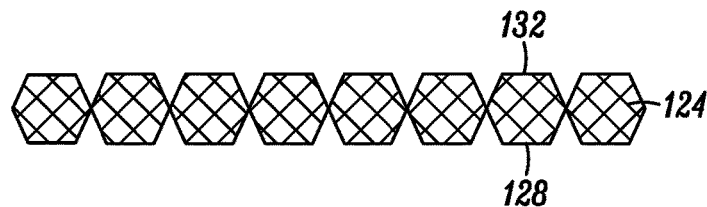

A method of making a unit cell with a metal support having a modified surface area is illustrated in FIGS. 8A-8F. A metal support 24 is provided in FIG. 8A. A laser can be used to etch the predetermined surface modifications onto the cathode-facing surface of the metal support 24 as shown in FIG. 8B. FIG. 8C illustrates the metal support 124 with both surfaces 128, 132 modified with the same surface geometry. Other means known to those skilled in the art to form the surface modifications can be used.

Figure 8D:
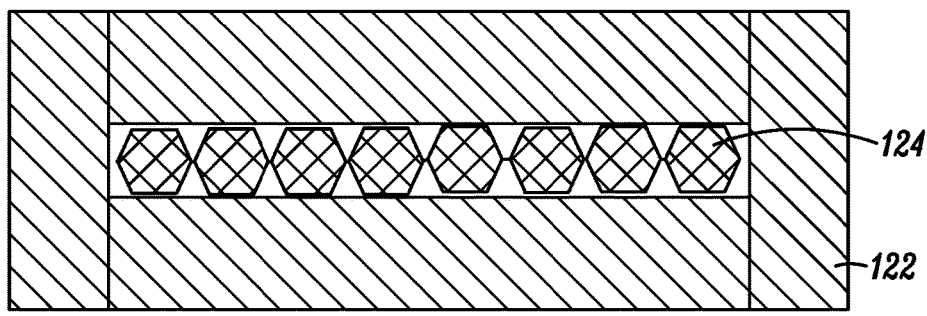
Figure 8E:
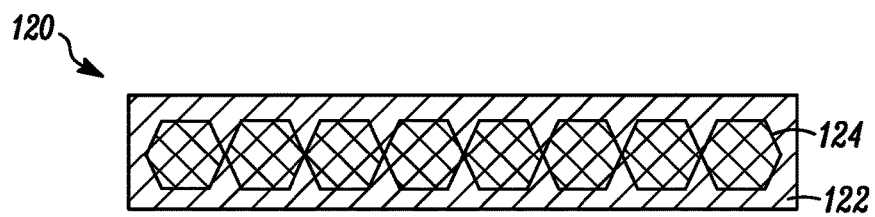
Figure 8F:
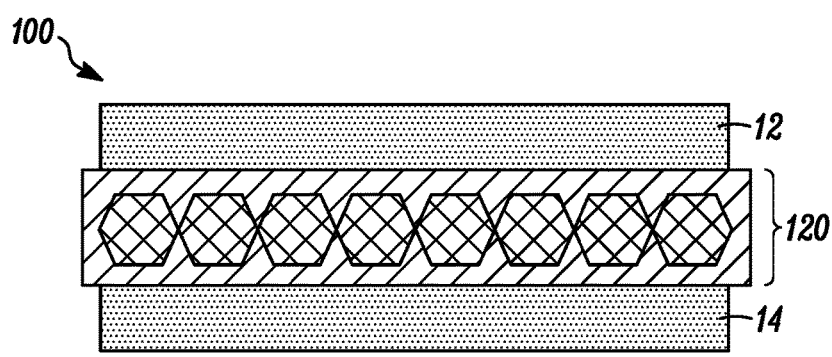

In FIG. 8D, the first solid electrolyte 122 with a binder is deposited on the modified metal support 124 and then sintered in FIG. 8E. The first solid electrolyte 122 can be applied with dip coating, using raw electrolyte tapes, and any other means known to those skilled in the art. The sintering shrinks the first solid electrolyte 122 and fills in any voids in the modified surfaces of the metal support 124. The cathode and anode porous supports are deposited onto the electrolyte structure 120, with the catalyst deposited onto the supports to form the cathode 14 and anode 12 in FIG. 8F. The method can be used to form the unit cell 10 without surface modifications on the metal substrate as well.

Figure 9:
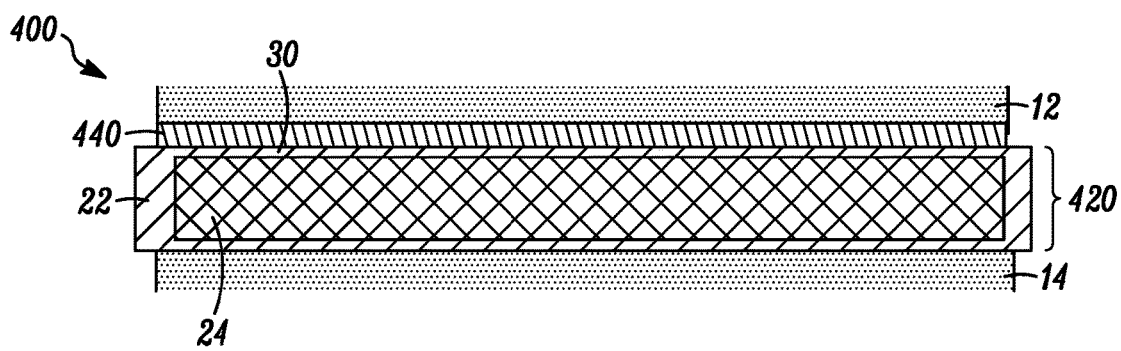
FIG. 9 is a cross-sectional view of yet another embodiment of a unit cell of a solid oxide electrochemical device as disclosed herein.

FIG. 9 illustrates a cross-sectional view of another embodiment of a unit cell 400 of a solid oxide electrochemical device. In this embodiment, the unit cell 10 described in FIG. 2 further includes an electrolyte structure 420 having a layer of a second solid electrolyte 440 between the cathode-facing layer 30 of the first solid electrolyte 22 and the cathode 14. The second solid electrolyte 440 is erbium-doped bismuth(III) oxide (Er-doped $Bi_2O_3$). The second solid electrolyte 440 has a higher conductivity than the first solid electrolyte and is stable in the cathodic atmosphere while being unstable in the anodic atmosphere; however, the second solid electrolyte 440 is not compatible with the metal support 24. The second solid electrolyte 440 can maintain a lower resistance in the unit cell and provide improved performance while maintaining the stability of the unit cell. One example of the electrolyte structure 420 includes a metal support 24 of stainless steel, a first solid electrolyte 22 of ScCeYSZ and the second solid electrolyte 440 of Er-doped $Bi_2O_3$. Although the layer of second solid electrolyte is only illustrated in combination with the electrolyte structure of unit cell 10, the layer of second solid electrolyte can be used in combination with any of the previous unit cell examples described herein.

Figure 10:
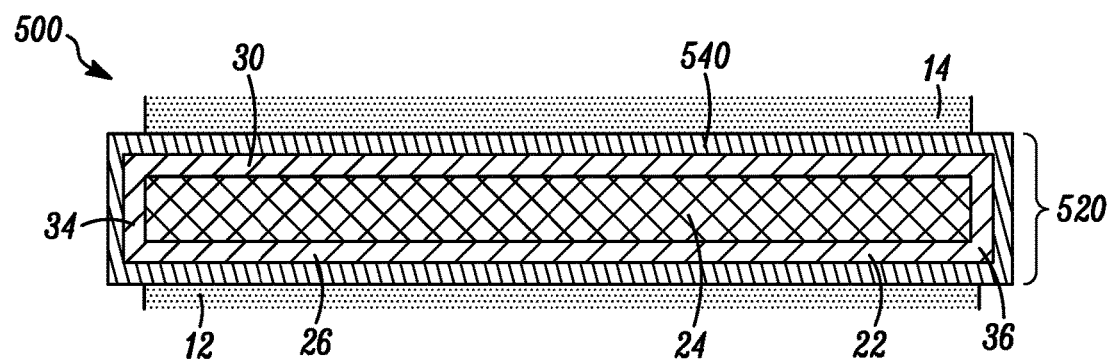
FIG. 10 is a cross-sectional view of yet another embodiment of a unit cell of a solid oxide electrochemical device as disclosed herein.

FIG. 10 illustrates a cross-sectional view of another embodiment of a unit cell 500 of a solid oxide electrochemical device. In this embodiment, the unit cell 10 described in FIG. 2 further includes an electrolyte structure 520 having a continuous layer of a third solid electrolyte 540 encompassing the first solid electrolyte 22 between each of the cathode-facing layer 30 of the first solid electrolyte 22 and the cathode 14, the anode-facing layer 26 and the anode 12, and along the side walls 34, 36 of the first solid electrolyte 22. The third solid electrolyte 540 forms a continuous path around the continuous path of the first solid electrolyte 22. The third solid electrolyte 540 has a higher conductivity than the first solid electrolyte and is stable in both the cathodic and anodic atmospheres; however, the third solid electrolyte 540 is not compatible with the metal support 24. The third solid electrolyte 540 can be, for example, $La_{0.8}Sr_{0.2}Ga_{0.8}Mg_{0.2}O_3$ (LSGM). One example of the electrolyte structure 520 includes a metal support 24 of stainless steel, a first solid electrolyte 22 of ScCeYSZ and the third solid electrolyte 540 of LGSM. Although the third solid electrolyte is only illustrated in combination with the electrolyte structure of unit cell 10, the third solid electrolyte can be used in combination with any of the previous unit cell examples described herein.

Figure 11:
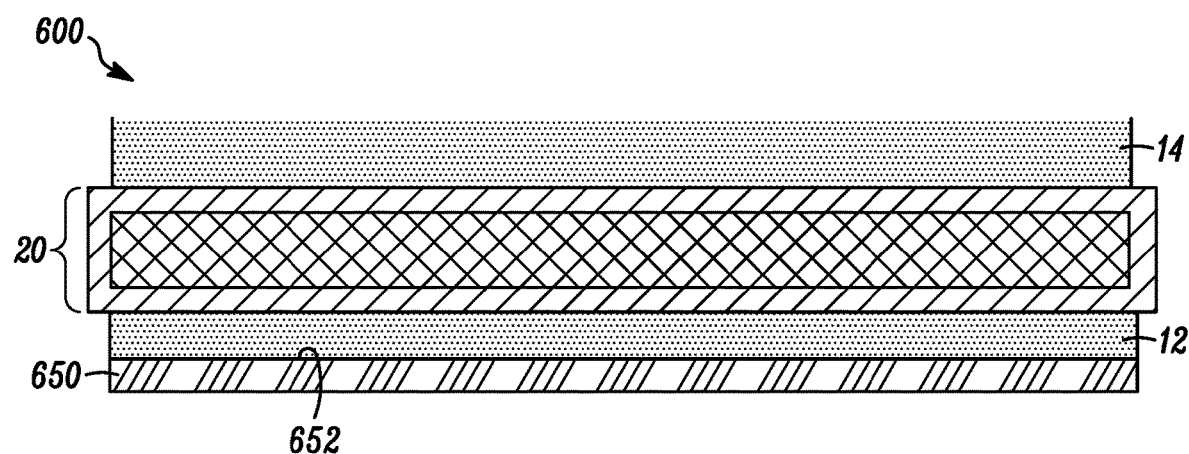
FIG. 11 is a cross-sectional view of yet another embodiment of a unit cell of a solid oxide electrochemical device having an internal reformer layer as disclosed herein.

FIG. 11 illustrates a cross-sectional view of another embodiment of a unit cell 600 of a solid oxide electrochemical device. In this embodiment, the unit cell 10 described in FIG. 2 further includes an internal reforming catalyst layer 650 formed on the anode 12 on a surface 652 opposite the electrolyte structure 20. The internal reforming catalyst layer 650 can be formed of $CeZrO_{2-y}$ with transition metals or noble metals. The internal reforming catalyst layer 650 produces a hydrogen-containing reformed gas from a hydrocarbon-based fuel using catalyst. The solid oxide electrochemical device generates electric power by using the reformed gas. For example, a hydrogen-containing reformed gas can be generated by reforming a hydrocarbon-based fuel, such as kerosene, in the internal reforming catalyst layer 650, which is supplied to a solid oxide fuel cell. Although the internal reforming catalyst layer 650 is only illustrated in combination with the electrolyte structure of unit cell 10, the internal reforming catalyst layer 540 can be used in combination with any of the previous unit cell examples described herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electrolyte structure for use in a solid oxide electrochemical device, the electrolyte structure comprising:
    a first solid electrolyte; and
    a metal support embedded in the first solid electrolyte such that the first solid electrolyte forms an anode-facing layer that covers an anode-facing surface of the metal support, a cathode-facing layer that covers a cathode-facing surface of the metal support, and two opposing side layers that cover side surfaces of the metal support to form a continuous path around the metal support.

2. The electrolyte structure of claim 1, wherein the first solid electrolyte is selected from the group consisting of doped bismuth oxide, yttria-stabilized zirconia (YSZ), scandia- and yttria-stabilized zirconia (ScYSZ), and scandia-, cesium- and yttria-stabilized zirconia (ScCeYSZ).

3. The electrolyte structure of claim 1, wherein the metal support is stainless steel.

4. The electrolyte structure of claim 1, wherein the metal support has a thickness between 10 µm and 2000 µm.

5. The electrolyte structure of claim 1, wherein the anode-facing layer and the cathode-facing layer each have a thickness of between 0.1 µm and 20 µm, inclusive.

6. The electrolyte structure of claim 1, further comprising:
    a second solid electrolyte coated on the cathode-facing layer of the first solid electrolyte, the second solid electrolyte having a higher conductivity than the first solid electrolyte.

7. The electrolyte structure of claim 6, wherein the second solid electrolyte is erbium-doped bismuth(III) oxide.

8. The electrolyte structure of claim 7, wherein the first solid electrolyte is ScCeYSZ.

9. The electrolyte structure of claim 1, further comprising:
    a second solid electrolyte coated on each of the anode-facing layer, the cathode-facing layer and the two opposing side layers of the first solid electrolyte, the second solid electrolyte having a higher conductivity than the first solid electrolyte.

10. The electrolyte structure of claim 9, wherein the first solid electrolyte is ScCeYSZ and the second electrolyte is $La_{0.8}Sr_{0.2}Ga_{0.8}Mg_{0.2}O_3$(LSGM).

11. The electrolyte structure of claim 1, wherein one or both of the anode-facing surface and the cathode-facing surface of the metal support is structurally modified to improve adhesion of the first solid electrolyte and increase surface area of the first solid electrolyte.

12. A solid oxide electrochemical device, comprising:
    an anode comprising a porous solid anode support and an anode catalyst;
    a cathode comprising a porous solid cathode support and a cathode catalyst; and the electrolyte structure of claim 1 positioned between the anode and the cathode.

13. The solid oxide electrochemical device of claim 12, wherein the metal support is stainless steel.

14. The solid oxide electrochemical device of claim 12, wherein the first solid electrolyte is selected from the group consisting of doped bismuth oxide, YSZ, ScYSZ, and ScCeYSZ.

15. The solid oxide electrochemical device of claim 12, wherein the electrolyte structure further comprises:
 a second solid electrolyte layered between the first solid electrolyte and the cathode, the second solid electrolyte having a higher conductivity than the first solid electrolyte.

16. The solid oxide electrochemical device of claim 15, wherein the second solid electrolyte is erbium-doped bismuth(III) oxide and the first solid electrolyte is ScCeYSZ.

17. The solid oxide electrochemical device of claim 12, wherein the electrolyte structure further comprises:
 a second solid electrolyte coated on all surfaces of the first solid electrolyte, the cathode- facing layer and the two opposing side layers of the first solid electrolyte, the second solid electrolyte having a higher conductivity than the first solid electrolyte.

18. The solid oxide electrochemical device of claim 17, wherein the first solid electrolyte is ScCeYSZ and the second electrolyte is LSGM.

19. The solid oxide electrochemical device of claim 12, wherein one or both of the anode-facing surface and the cathode-facing surface of the metal support is structurally modified to improve adhesion of the first solid electrolyte and increase surface area of the first solid electrolyte.

20. The solid oxide electrochemical device of claim 12, further comprising:
 an internal reforming catalyst layer on the anode opposite the electrolyte structure.

\* \* \* \* \*